United States Patent [19]

Nozaki et al.

[11] 4,393,307

[45] Jul. 12, 1983

[54] NEUTRON DETECTORS

[75] Inventors: Shinichi Nozaki, Yokohama; Ichiro Tai, Tokyo; Shimpey Shirayama, Yokohama, all of Japan

[73] Assignee: Tokyo Shibaura Denki Kabushiki Kaisha, Kanagawa, Japan

[21] Appl. No.: 205,613

[22] Filed: Nov. 10, 1980

[30] Foreign Application Priority Data

Nov. 15, 1979 [JP] Japan .............................. 54-148189

[51] Int. Cl.[3] .............................................. G01T 3/00

[52] U.S. Cl. .................................... 250/390; 250/392; 376/259

[58] Field of Search ............... 250/390, 391, 392, 374, 250/385; 376/254, 259

[56] References Cited

U.S. PATENT DOCUMENTS 3,982,131 9/1976 Haller ................................ 250/390

*Primary Examiner*—Davis L. Willis

*Attorney, Agent, or Firm*—Stevens, Davis, Miller & Mosher

[57] ABSTRACT

In a neutron detector of the type comprising an ionization chamber provided with anode and cathode electrodes for detecting neutron flux injected into the ionization chamber, and a cable including a central conductor connected to the anode or cathode electrode and the outer conductor connected to the cathode or anode electrode there are provided an intermediate insulated annular conductor arranged between the inner and outer conductors of the cable, and upper and lower insulated annular conductors disposed between the anode and cathode electrodes for supporting one of them. The upper and lower insulated annular conductors are electrically interconnected and the upper insulated annular conductor is connected to the intermediate annular conductor of the cable.

2 Claims, 6 Drawing Figures

NEUTRON DETECTORS

BACKGROUND OF THE INVENTION

This invention relates to a neutron detector arranged, for example, in a nuclear reactor and particularly adapted to exactly detect neutrons in spite of lowering of insulation resistance of an insulating member constituting the neutron detector, the lowering of the insulation resistance being caused by a high temperature in the reactor.

Generally, neutrons are measured indirectly by detecting electrically charged particles or γ-rays generated by the nuclear reaction of neutrons and atomic nucleus for the reason that the neutrons cannot be directly detected by ionization reaction because they have no electric charge. For this reason, a gas ionization chamber type neutron detector is used as a neutron detector in which a predetermined d.c. voltage is applied across an anode electrode and a cathode electrode disposed in the ionization chamber to generate an electric field therebetween. A neutron converting element, which reacts with the neutrons and converts them into electrically charged particles or γ-rays, such as uranium, boron, or plutonium is baked on the surface of at least one of the anode and cathode electrodes. An inert gas such as argon or helium is charged in the ionization chamber and electrically charged particles generated by the reaction ionize the inert gas in the chamber to generate electrons and ions. Due to the generation of the electric field between the anode and the cathode electrodes, the ions and electrons are attracted to the anode and the cathode electrodes respectively thereby to pass an ionization current therebetween in proportion to the intensity of the injected neutron flux. Therefore, the injected neutron flux can be detected by measuring the ionization current thus generated.

However, in a case where a gas ionization chamber type neutron detector described above is disposed in a nuclear reactor under a high temperature environment, since specific resistance of an insulating member, such as alumina used to construct the ionization chamber is low under a high temperature environment, it is difficult to prevent the flow of leakage current which is proportional to the voltage applied across the anode and the cathode electrodes. In addition, the leakage current is added to the ionization current generated at the same time and this combined current is detected and measured as an output current. Therefore, it is impossible to obtain the true ionization current in proportion to the injected neutron flex by measuring the combined current. For example, even high purity alumina which is one of known inorganic insulation materials having the most highest stability with respect to heat becomes electroconductive at a high temperature of more than about 800° C. and it cannot be used as an insulating material.

In order to obviate the defect described above and to use this type neutron detector for measuring the ionization current in proportion to the injected neutron flux, it has been desired to reduce the ratio of the leakage current to the ionization current to a negligible value i.e., 1/100 or less. The reduction of this ratio may be achieved by increasing a neutron sensitivity or by reducing the insulation resistance of the insulating material as much as possible. However, for increasing the neutron sensitivity, the dimensions of the ionization chamber must be enlarged, which is of course undesirable. Thus, in order to obtain actual ionization current created by the injected neutron flux, it is desired to suppress the tendency of lowering of the insulation resistance of the ionization chamber as much as possible.

FIG. 1 shows a vertical elevation of one of known gas ionization chamber type neutron detectors, in which an ionization chamber D is connected to the lower end of a guide cable C for deriving an ionization current out of the reactor core. At the substantially central portion of the ionization chamber is provided an anode electrode 1 and on the surface of a cathode electrode 2 facing the anode electrode 1 is deposited, by baking for example, a neutron converting element 3 consisting of at least one of uranium, boron, and plutonium which undergo a nuclear reaction with the injected neutron flux thereby to generate electrically charged particles. The cathode electrode 2 is constructed to act as an outer casing of the ionization chamber D. The anode electrode 1 is insulated from the cathode electrode 2 and supported by an inorganic insulating material 5 such as magnesia, alumina, boron nitride or silica, and an inert gas such as argon or helium is filled in a space between the anode and the cathode electrodes of the ionization chamber. The guide cable C comprises a central electric conductor 11 extending axially of the cable, an outer electric conductor 14 made of a metal coated tube arranged coaxially with the conductor 11, and an inorganic insulating material 15 such as alumina, magnesia, boron nitride, or silica filling the space between the electric conductors 11 and 14. The lower end of the central conductor 11 is electrically connected to the upper end of the anode electrode 1 and the lower end of the outer conductor 14 is electrically connected to the cathode electrode 2. The insides of the cable C and the ionization chamber D are air tightly sealed and separated by a partition wall 16 made of an inorganic insulating material such as magnesia, alumina, boron nitride or silica, and the upper end, not shown, of the cable C is also sealed in the same manner.

In a neutron detector described above, neutron flux injected into the ionization chamber undergoes nuclear reaction with only the neutron converting element 3 deposited on the inner surface of the cathode electrode 2 thereby to generate an ionization current which is measured through the conductor 11 by a known device disposed externally of the reactor core. However, since the interior of the reactor core is under high energy condition and high neutron flux density (about $10^{14}$ neutrons/cm$^2$/sec.), and since the reactor is operated at a high temperature of about 800°-1000° C., the insulation resistance of the insulating material constituting the neutron detector of the type described above is lowered and the leakage current is added to the ionization current, which makes difficult to measure only the actual ionization current created by the injected neutron flux.

An equivalent circuit of a neutron detector shown in FIG. 1 is shown in FIG. 2, in which currents $I_1$, $I_2$, and $I_3$ flow through an insulation resistance $R_1$ of the cable C, an insulation $R_2$ of the partition wall 16, and the insulation resistance $R_3$ of the inorganic insulating member 5, when a voltage is applied from a power source V. Current $I_0$ corresponding to the sum of these currents $I_1$, $I_2$, $I_3$ and an ionization current $I_4$ created by the injected neutron flux passes through an ampere meter A. The equivalent circuit shown in FIG. 2 may be further simplified as shown in FIG. 3, in which current $I_0$ corresponding to the sum of the ionization current $I_4$ and current $I_R$ passing through an inner (anode) resistance $R_0$ is measured by the ampere meter A. As can be understood from this circuit, the resistance $R_0$ lowers when the inner temperature of the neutron detector increases and the current $I_0$ also increases. Thus, the ampere meter A cannot indicate only the actual ionization current $I_4$.

SUMMARY OF THE INVENTION

Accordingly, an object of this invention is to obviate defects of a prior-type neutron detector described above and to provide an improved neutron detector capable of detecting a true ionization current created by neutron flux injected into the detector containing substantially no leakage current from an inner insulating material caused under a high temperature atmosphere.

According to this invention there is provided a neutron detector of the type comprising an ionization chamber provided with an anode electrode and a cathode electrode for detecting neutron flux injected into the ionization chamber and a guide cable connected to the ionization chamber, the guide cable comprising a central conductor arranged within and coaxially with the cable and connected to one of the anode and cathode electrodes for deriving ionization current created by the neutron flux out of the ionization chamber, and an outer conductor extending coaxially with the central conductor and insulated therefrom, the outer conductor being connected to the other one of the anode and cathode electrodes and electrically connected to a casing of the ionization chamber, wherein an intermediate annular conductor is arranged coaxially with and between the central and outer conductors of the cable and insulated therefrom, and upper and lower annular conductors are embedded in insulating members disposed between the anode and cathode electrodes for supporting one of the anode and cathode electrodes which is connected to the central conductor, the upper and lower annular conductors are electrically connected together and the upper annular conductor is connected to the intermediate annular conductor of the guide cable.

DESCRIPTION OF THE PREFERRED EMBODIMENT

Figure 1:
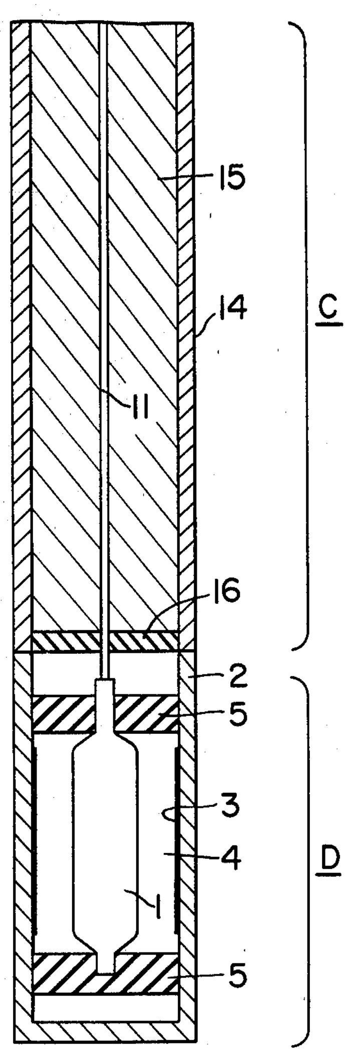
FIG. 1 PRIOR ART
FIG. 1 is a shematic vertical section view of a prior art ionization chamber type neutron detector arranged in a nuclear reactor.
Figure 4:
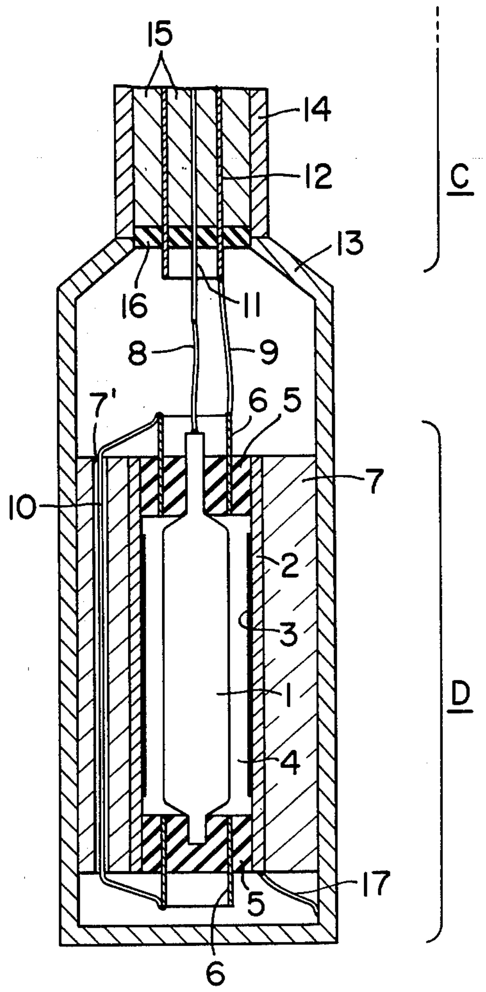
FIG. 4 is a schematic vertical sectional view of an ionization chamber type neutron detector according to this invention.
Figure 2:
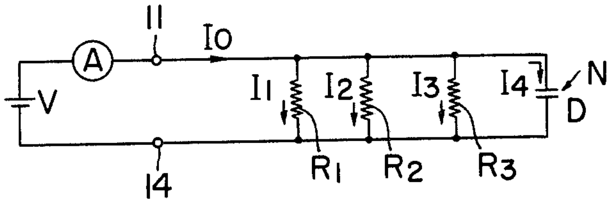
FIG. 2 PRIOR ART
FIG. 2 shows an equivalent circuit of the neutron detector shown in FIG. 1.
Figure 3:
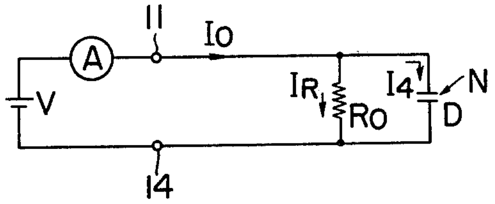
FIG. 3 PRIOR ART
FIG. 3 shows a simplified one of the equivalent circuit shown in FIG. 2.

A gas ionization chamber type neutron detector according to this invention is shown in FIG. 4, in which the same reference numerals are applied to elements corresponding to those shown in FIGS. 1 through 3. In FIG. 4, in the cable C is arranged a tubular intermediate electric conductor 12 coaxially between the central conductor 11 and the outer conductor 14, and an inorganic insulating material 15 such as alumina, magnesia, boron nitride, or silica is filled in the spaces between the respective conductors thereby insulating the conductors with each other.

The anode electrode 1 of the ionization chamber D of the neutron detector is supported at its upper and lower ends by supporting members 5 made of an inorganic insulating material such as alumina, magnesia, silica, or beryllia, and the anode electrode 1 is electrically insulated from the cathode electrode 2 by the supporting members 5. Within both supporting members 5 are disposed annular electric conductors 6, which are electrically insulated from the anode electrode 1 and the cathode electrode 2. The cathode electrode 2 and a casing 13 of the ionization chamber D are insulated by an insulation guard 7 made of an inorganic insulating material such as alumina, magnesia, silica, or beryllia filling the space between the cathode electrode 2 and the casing 13. The insulation guard 7 is provided with a vertical through hole 7′ through which a short-circuiting conductor 10 extends and both ends of this conductor 10 are electrically connected to the upper and lower annular conductors 6, respectively. The upper annular conductor 6 is connected to the intermediate tubular conductor 12 in the cable C through a connection conductor 9.

The anode electrode 1 is connected to the central conductor 12 in the cable C through a connection conductor 8 and the cathode electrode 2 is connected to the casing 13 through a grounding conductor 17. On the inner surface of the cathode electrode 2 facing the anode electrode 1 is deposited, by baking for example, a neutron converting element 3 made of boron, uranium, or pultonium, and an inert ionization gas such as argon or helium is sealed within the ionization chamber D. The cable C and the ionization chamber D are air-tightly parted at one end by a partition wall 16 made of inorganic insulating material such as alumina or beryllia and at the other end, not shown, the cable C is also closed air-tightly.

Figure 5:
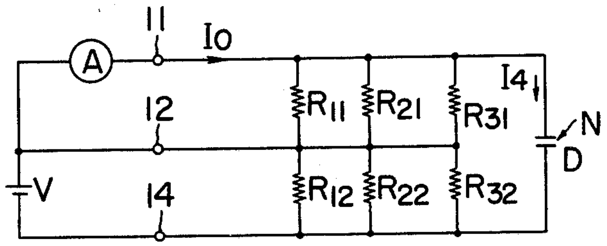
FIG. 5 shows an equivalent circuit of the neutron detector shown in FIG. 4.

An equivalent circuit of the neutron detector shown in FIG. 4 is illustrated by FIG. 5, in which, regarding the guide cable C and the air tight partition wall 16, insulation resistances $R_{11}$ and $R_{21}$ exist between the intermediate tubular conductor 12 and the central conductor 11 and insulation resistances $R_{12}$ and $R_{22}$ exist between the intermediate conductor 12 and the outer conductor 14. Regarding the ionization chamber D, insulation resistance $R_{32}$ exists between the annular conductor 6 and the cathode electrode 2 and insulation resistance $R_{31}$ exists between the annular conductor 6 and the anode electrode 1.

Figure 6:
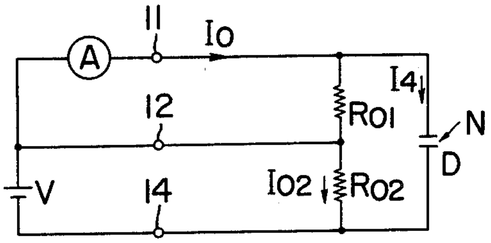
FIG. 6 shows a simplified one of the equivalent circuit shown in FIG. 5.

The equivalent circuit of FIG. 5 can be simplified as shown in FIG. 6 in which an insulation resistance $R_{01}$ exists between the intermediate conductor 12 and the central conductor 11 leading to the output terminal of the neutron detector and an insulation resistance $R_{02}$ exists between the intermediate conductor 12 and the outer conductor 14. A capacitance N of the neutron detector D exists between the central conductor 11 and the outer conductor 14. From a power source V is applied d.c. voltage across the respective conductors 11, 12, and 14, and an ampere meter A is connected between the central conductor 11 and the outer conductor 14. Then the conductors 12 and 11 will have the same potential.

As can be noted from FIG. 6, there are provided a closed circuit including the intermediate conductor 12, the outer conductor 14 and the insulation resistance $R_{02}$ and another circuit including the central conductor 11, the intermediate conductor 12 and the insulation resistance $R_{01}$, so that leakage current $I_{02}$ caused by the insulation resistance $R_{02}$ would not be measured by the ampere meter A. In addition, since the conductors 11 and 12 are at the same potential, leakage current does not flow through the latter closed circuit. The ionization current $I_4$ created by the neutron flux in the ionization chamber flows through the closed circuit including the conductor 11, the power source V, and the outer conductor 14. Thus only the current $I_4$ containing no leakage current will be indicated by the ampere meter A.

In one preferred embodiment according to this invention stainless steel was used as electroconductive elements and alumina having a high purity was used as the inorganic insulating material. At a high temperature of 800°-1,000° C. d.c. voltage of 100 V was applied to the detector and an insulation resistance value of more than $10^7\Omega$ was obtained which means that lowering of the insulation resistance, which was inevitable in the prior art device, was not observed.

According to this invention, a true ionization current created by the injected neutron flux including no leakage current can be measured under a high temperature condition in a nuclear reactor core. Moreover, the distribution of the neutron flux can be measured by arranging a plurality of the neutron detectors of the type described above with predetermined spacings in the nuclear reactor core. In addition, it is possible to deposit neutron converting element on the surface of the anode electrode facing the cathode electrode instead of depositing it on the cathode electrode.

What is claimed is:

1. In a neutron detector of the type comprising an ionization chamber provided with an anode electrode and a cathode electrode for detecting neutron flux injected into said ionization chamber and a guide cable connected to said ionization chamber, said guide cable comprising a central conductor arranged within and coaxially with said cable and connected to one of said anode electrode and cathode electrode for deriving ionization current created by said neutron flux out of said ionization chamber, and an outer conductor extending coaxially with said central conductor and insulated therefrom, said outer conductor being connected to the other one of said anode and cathode electrodes, said outer conductor being electrically connected to a casing of said ionization chamber, the improvement which comprises an intermediate annular conductor arranged coaxially with and between said central and outer conductors of said cable and insulated therefrom, and upper and lower annular conductors embedded in insulating members disposed between said anode and cathode electrodes for supporting said one of the anode and cathode electrodes which is connected to said central conductor, said upper and lower annular conductors being electrically connected together and said upper annular conductor being connected to said intermediate annular conductor of said guide cable.

2. The neutron detector according to claim 1 which further comprises an insulation guard disposed between said casing of the ionization chamber and said other one of the anode and cathode electrodes which is connected to said outer conductor of said cable, said insulation guard being provided with a vertical through hole, said upper and lower annular conductors being connected together through a conductor extending through said vertical through hole.

* * * * *